July 1, 1958

K. J. RADIMER 2,841,544

PROCESS FOR THE PRODUCTION OF
FLUORINE-CONTAINING COMPOUNDS

Filed April 24, 1956

INVENTOR.
KENNETH J RADIMER

BY G. H. Palmer
Cruzan Alexander
ATTORNEYS
Marylin Klosty
PATENT AGENT

July 1, 1958

K. J. RADIMER
PROCESS FOR THE PRODUCTION OF
FLUORINE-CONTAINING COMPOUNDS 2,841,544

Filed April 24, 1956

INVENTOR.
KENNETH J. RADIMER
BY  G. H. Palmer
    Cruzan Alexander
      ATTORNEYS
    Marylin Klosty
    PATENT AGENT

United States Patent Office 2,841,544
Patented July 1, 1958

2,841,544

PROCESS FOR THE PRODUCTION OF FLUORINE-CONTAINING COMPOUNDS

Kenneth J. Radimer, Little Falls, N. J., assignor, by mesne assignments, to Minnesota Mining and Manufacturing Company, St. Paul, Minn., a corporation of Delaware Application April 24, 1956, Serial No. 580,260

27 Claims. (Cl. 204—62)

The present invention relates to a novel and improved process for the production of fluorine-containing organic compounds. In one aspect this invention relates to an improved process for the production of carbon compounds containing fluorine as well as carbon compounds containing fluorine and another halogen. In another aspect this invention relates to a continuous process which can be controlled to yield fluorine-containing organic compounds such as fluorochlorocarbons having a desired halogen content. In still another aspect this invention relates to an economical process for the production of fluorine-containing organic compounds which process is accompanied by the formation of a second type of valuable product.

Fluorine-containing organic compounds such as the lower molecular weight normally gaseous and liquid fluorochlorocarbons and fluorobromocarbons are known to possess value in many fields of industrial chemistry. For example, they are useful as refrigerants, dielectrics, fire extinguishing materials, and propellants. They also are useful as intermediates for the production of plastics and synthetic elastomers. In many instances a wider commercial application of such compounds has been limited due to the difficulty in their preparation, the presently employed processes involving many chemical and mechanical steps and the utilization of costly starting materials. In many instances the full utilization of the starting material is not realized thereby increasing the cost of manufacture of such fluorine-containing compounds.

It is an object of the present invention to provide a novel and improved process for the production of fluorine-containing organic compounds.

Another object is to provide a novel process for the production of fluorohalocarbons such as fluorochlorocarbons which process is commercially feasible, economical, leads to the maximum utilization of the starting material, and is accompanied by the minimum formation of undesirable by-products.

Another object is to provide a direct and continuous process for the production of various fluorine-containing organic compounds which process is readily controlled to yield products having a desired halogen content.

A further object is to provide an improved process for the production of fluorine-containing organic compounds which process is commercially attractive and economical from the standpoint that another type of valuable product is produced and recovered as a product of the process.

A further object is to provide a process for the production of fluorochloroalkanes in good yield and selectivity.

A still further object is to provide a process for the production of perfluorochloroalkanes having at least as many fluorine atoms as there are chlorine atoms in improved yields.

Various other objects and advantages of this invention will become apparent to those skilled in the art from the accompanying description and disclosure.

Accordingly, these objects are accomplished by the process which comprises passing an electric current between a cathode and an anode through a melt of a metal fluoride, i. e. an inorganic compound of fluorine containing at least one metal constituent, under conditions such that there is no arcing between the electrodes, in the presence of an added organic compound as a reactant, to produce a fluorine-containing organic compound at the anode, and recovering said fluorine-containing organic compound as a product of the process. The organic compounds which are most beneficially employed as reactants are those containing at least one halogen atom bonded to carbon and include the partially halogenated and perhalogenated organic compounds of both the aliphatic and aromatic series. In accordance with the preferred embodiment of this invention a halogen-containing organic reactant is continuously charged to the reaction zone in the vapor phase and in such a manner that it is brought into contact with the molten metal fluoride and anode while continuously withdrawing the product produced at the anode as it is formed. The process of this invention also leads to the formation of an elemental metal at the cathode which metal may be recovered as a second type of valuable product of the process.

The process of this invention is an electrolysis reaction involving the passage of a current between a cathode and an anode through a melt of the fluoride as the electrolyte and is carried out at a substantially high cell potential, i. e. at a voltage which is at least 30 volts. It has been found that no electrolysis occurs and that no product is produced at the anode when an electric arc exists between the electrodes. This is attributed to the observation that when the arc exists in the molten electrolyte, there is essentially no passage of current through the electrolyte. Whenever such an arc is seen to exist between the electrodes, the voltage drops to a value usually below 30 volts which low voltage is insufficient to allow for the electrolytic anodic reaction herein described.

The products produced by the process of this invention are valuable fluorine-containing organic compounds, some of which are difficult to prepare or cannot be prepared by presently known methods. The products of this invention are referred to herein as fluorocarbons which term is meant to include compounds containing only carbon and fluorine (i. e. perfluorocarbons); compounds containing only carbon, fluorine, and another halogen such as the perfluorochlorocarbons and perfluorobromocarbons; as well as partially halogenated fluorocarbons such as those containing hydrogen in addition to halogen (i. e. hydrofluorocarbons).

The products produced at the anode by the presently described process possess a greater number of fluorine atoms than the organic starting material, the molten metal fluoride serving as the source of added fluorine found in the anodic product. It is to be pointed out that the oxidation or fluorination reaction effected at the anode is brought about by an electrolytic action. Thus, when carbon tetrachloride and molten sodium fluoaluminate, for example, are contacted under the electrolysis conditions described herein, an anodic reaction takes place involving the formation of a fluorine-containing organic product, the process being operable by virtue of the electrolytic action of the reaction medium under the presently described conditions. Although the use of an anode comprising carbon is not essential to the successful production of fluorine-containing organic products in accordance with this invention, the use of a carbon anode is preferred since it may serve as a source of carbon.

When an anode other than carbon is employed, the sole source of carbon in the final product is the added organic reactant and when a carbon anode is employed, the carbon anode may be the sole source or an additional source of carbon. The essential source of halogen other than fluorine in the anodic product is the added halogen-containing reactant. However, it is to be understood that the use of molecular halogen other than fluorine such as chlorine, bromine, and iodine may be used in admixture with the added halogen compound without departing from the scope of this invention.

The halogen-containing organic reactants to be employed include the partially halogenated and perhalogenated compounds of both the aliphatic and aromatic series. The preferred group of halogenated reactants comprises the saturated and unsaturated aliphatic compounds having from one to about ten carbon atoms per molecule and having halogen other than fluorine as the only halogen substitution, and are, for example, the: perchloroalkanes, perbromoalkanes, perchlorobromoalkanes, perchloroalkenes, perbromoalkenes, perchlorocycloalkanes, perchloro-cycloalkenes, hydrochloroalkanes, hydrobromoalkanes, and the like. Typical examples of this preferred group of reactants to be employed in the process of this invention are as follows: Trichloromethane; dichloromethane; carbon tetrachloride; carbon tetrabromide, chlorobromomethane; 1,2-dibromo-tetrachloroethane; hexachloroethane; 1,1,2,3,3,-pentachloropropane; 1,2-dichloropropane; hexachlorobutanes; 1-chlorobutane; 1-chloropentane; dodecylchloroheptanes; trichloroethylene; 1,2-dichloroethylene; tetrachloroethylene; bromoethylene; 1,2,3,3-tetrachloro-1-propene; hexachloropropene, octachlorobutene; 1,2,3,4,5,5,6,6-octachloro-1-hexene; dodecylchloroheptenes; 1,1,2,3,4,5,5,5 - octachloro - 3 - (1,2,2,2 - tetrachloroethyl) - 1-pentene; undecachlorooctenes; chloroprene; hexachlorobutadiene; perchlorohexatriene; perchlorocyclobutene; and perchlorocyclohexene.

Also included within the scope of the aliphatic reactants to be employed are compounds containing fluorine as the sole halogen substituent, as well as compounds containing fluorine and another halogen. Typical examples of the fluorine-containing reactants to be employed are as follows: monochlorodifluoromethane; dichlorodifluoromethane; trichlorofluoromethane; 1,1,1-trifluoroethane; 1,2-dibromo-2-chlorotrifluoroethane; 1,2-dibromotetrafluoroethane; 1,2,2,3,3 - pentachloro - 1,1-difluoropropane; 1,6 - dichloro-3,4 - bis (chlorodifluoromethyl) perfluorohexane; hexachloro-1,1,4,4-tetrafluorobutane; octachloro-1,4-difluorobutane; 1,2,3,4-tetrabromoperfluorobutane; bromotrifluoroethylene; tetrafluoroethylene; 1,1,2-trichlorotrifluoro-1-propene; 3,3,4-trichloroperfluoro - 1 - butene; hexachloro - bis (trifluoromethyl)) cyclohexane; 1,2,3,4-tetrachlorodifluorobutadiene; and other similar fluorine-containing compounds of the aliphatic series.

As indicated above, halogen-containing aromatic compounds also may be included as a reactant in the process of this invention and are typically exemplified by the following: hexachlorobenzene; tetrachloro(pentachloroethyl) benzene; (dichloromethyl) benzene; benzyl chloride; benzotrichloride, (dichlorotrifluoroethyl) benzene; pentachlorobenzotrifluoride; pentachloro (dichlorotrifluoroethyl) benzenes; perchloro (ethylbenzene); trichloro-bis- (trichloromethyl) benzenes; dichloro-1,3-bis (trichloromethyl) benzenes; 1,3-bis (trichloromethyl) benzene; tetrachloro-1,4-dimethylbenzene; 1,3,5-tris (trichloromethyl) benzene, and perchlorobiphenyl.

Other organic compounds which may be used as a reactant in the process of this invention leading to fluorine-containing organic compounds are acylic and alicyclic hydrocarbons preferably having from 1 to about 10 carbon atoms per molecule including both mono-unsaturated and poly-unsaturated compounds such as, for example, ethylene, acetylene, propylene, cyclohexene, butadiene, benzene, xylenes and naphthalene.

The starting material may contain other substituents bonded to carbon such as nitro, hydroxyl, cyano, and sulfhydryl radicals in addition to halogen and hydrogen. It is to be understood that any of the above-indicated organic reactants may be used singly or in admixture without departing from the scope of this invention.

One embodiment of the present invention is directed to the production of normally gaseous and liquid fluorohalocarbons such as fluorochloroalkanes and fluorobromoalkanes which compounds are difficultly prepared and have a wider application as refrigerants, fire extinguishing materials, and propellants, for example, than the corresponding perfluorocarbons. Thus, in accordance with this embodiment of the present invention starting materials are chosen which lead to the formation of chlorine and bromine substituted fluorocarbons such as $CF_3Cl$, $CF_2Cl_2$, $CFCl_3$, etc. in good yield and selectivity and to the minimum formation of perfluoroalkanes such as $CF_4$ and $C_2F_6$. In this respect it is pointed out that perfluorochloroalkanes are produced in improved yield and selectivity by employing a perchlorinated compound such as $CCl_4$, $C_2Cl_4$, and $C_3Cl_8$ as the main source of chlorine than when molecular chlorine is used as the sole source of this halogen, and that essentially no perfluorinated product is thereby obtained. Although the electrolysis of a metal fluoride in the presence of a carbon anode and chlorine as essentially the sole reactants leads to the production of fluorochlorocarbons in good yield such a reaction also is accompanied by relatively high yields of perfluoroalkanes.

The selection of a particular halogen compound to be used as a reactant depends largely upon the type of halogen substitution desired in the final product. Thus, for example, when it is desired to produce compounds having only fluorine and chlorine substituents, a perchlorinated reactant is preferably employed. Similarly, when it is desired to produce compounds having fluorine and bromine substituents, a perbrominated reactant is preferably employed. Generally speaking, one of the predominant products produced at the anode when a perchlorocarbon is used, is one having at least as many fluorines as there are chlorine atoms. Thus, when perchloropropane, for example, is reacted under the electrolysis conditions described herein, one of the preponderant compounds produced at the anode is one having a fluorine: chlorine ratio of at least 1:1. When it may be desired to obtain a highly fluorinated product, a convenient and recommended way of accomplishing this is to recycle the products evolved at the anode from reaction involving a perchlorocarbon, through the hollow anode and to continue the reaction and recycling step until the products obtained are more highly or fully fluorinated.

As indicated above, the electrolyte which also is the major source of added fluorine in the organic product produced in accordance with the present invention comprises an inorganic compound of fluorine having at least one metal constituent, which metal may be monovalent or polyvalent. It is to be understood that the electrolyte which is referred to herein as a metal fluoride may contain certain non-metallic constituents in addition to the metal constituent. The classification of elements into metals and non metals is well-known to the art. For example, Deming's Periodic Table used in his book entitled, "General Chemistry" (J. Wiley & Sons, Incorporated, 5th edition, pages 11–13), and in the Handbook of Chemistry and Physics, 23rd edition (1939), page 346, shows that the metals are the elements of group I having an atomic number higher than one; groups II, III–B, IV–B, V–B, VI–B, VII–B, and VIII; and the elements of groups III–A, IV–A, V–A, VI–A which have atomic numbers above 5, 14, 33, and 52, respectively. Of the remaining elements which are correspondingly classified as non-metals, any one having a positive valence may suitably be employed as the non-metallic constituent of the electrolyte when it is desired to have such a constituent present, provided that it is employed in its positive valence state and preferably in its highest oxidation state. The preferred non-metallic constituents are: boron (atomic number 5)—group III–A; carbon (atomic number 6) and silicon (atomic number 14) of group IV–A; phosphorus (atomic number 15) of group V–A; and the elements of group VI–A of atomic number 16 to 52, inclusive.

The metal fluoride may be a binary fluoride, i. e. a compound containing only two constituents, namely fluorine and a metal, or it may be a complex fluoride, i. e. a compound containing fluorine, a metal, and a non-metal or second metal constituent such as in the ternary fluorides. Typical examples of suitable metal fluorides which are used as the electrolyte in accordance with the present invention are: lithium fluoride, sodium fluoride, potassium fluoride, cesium fluoride, beryllium fluoride, magnesium fluoride, calcium fluoride, strontium fluoride, barium fluoride, sodium fluoaluminate, aluminum trifluoride, titanium fluoride, thalium fluoride, vanadium fluoride, tantalum fluoride, bismuth fluoride, antimony pentafluoride, rubidium fluoride, barium fluosilicate, cesium fluosilicate, potassium fluosilicate, columbium fluoride, sodium fluocolumbate, molybdenum fluoride, potassium fluogermanate, sodium fluoborate, potassium fluoberyllate, potassium fluozirconate, potassium fluotantalate and potassium fluotitanate.

It is to be understood that the above metal fluorides may be used singly or in admixture without departing from the scope of this invention. It is sometimes desirable to reduce the melting point of the electrolyte by employing a eutectic mixture of metal fluorides which mixture may be as complex as desired, and to employ such mixtures as solvents or suspending agents for a metal fluoride undergoing electrolysis. For example, eutectic mixtures of any two or more of NaF, KF, $CaF_2$, $MgF_2$, $AlF_3$, $BaF_2$, $Na_3AlF_6$, etc. may be employed.

Typical examples of specific eutectic mixtures and their melting points which are advantageously employed as the electrolyte in the process of this invention are as follows where the concentration of each ingredient of the mixture is expressed in weight percent: calcium fluoride (49%) and sodium fluoride (51%)—melting point 810° C.; sodium fluoride (40%) and potassium fluoride (60%)—melting point 722° C.; calcium fluoride (14%), sodium fluoride (36%) and potassium fluoride (50%)—melting point 682° C.; calcium fluoride (20%), sodium fluoride (22%) and aluminum trifluoride (58%)—melting point 740° C.; sodium fluoride (15%), barium fluoride (63%) and magnesium fluoride (22%)—melting point 835° C.; potassium fluoride (69%) and lithium fluoride (31%)—melting point 492° C.; potassium fluoride (23%) and calcium fluoride (77%)—melting point 1060° C.; and lithium fluoride (64%) and magnesium fluoride (36%)—melting point 735° C. It is within the scope of this invention to dissolve or suspend a fluoride of a less basic metal (i. e. a more noble metal) in another fluoride or mixture of fluorides of a more basic metal. Thus, for example, a mixture of calcium fluoride and potassium fluoride may be used as a solvent for aluminum trifluoride. When such a mixture is electrolyzed as described herein, the less basic metal, i. e. aluminum, is found at the cathode and is recovered as a product of the process.

The process of this invention is carried out in a suitably designed electrolytic cell provided with a cathode and an anode, a means for introducing the organic reactant into the cell so that it is brought into contact with the anode and molten electrolyte, and a means for removing the fluorine-containing organic product as it is formed. The anode may be composed of platinum or other inert metal, and is preferably composed of crystalline or amorphous carbon and is usually made of ordinary commercial baked carbon. When the anode is composed of carbon, the activity or state of subdivision of the carbon is apparently of little consequence for the successful production of the fluorine-containing organic product at the anode, but the carbon or other anode material, of course, must possess sufficient electrical conductivity. When a carbon anode is used, the carbon need not be rigorously pure and may contain the normal ash content of commercial carbon or graphite. The anode may constitute the entire inner lining of the cell or any portion thereof, although for more facile manipulation and operation of the electrolysis process described herein, the anode is generally in the form of a pipe, rod, or plate which can be immersed in the electrolyte. It is preferred that the anode be in the form of a hollow rod or plate through which the organic reactant may be conveniently and advantageously introduced during the electrolysis reaction. The end of the hollow anode which is immersed in the electrolyte may be open, perforated, porous, or packed with carbon rods or pellets without departing from the scope of this invention. In order to obtain an increased surface area for reaction, a perforated or porous hollow rod is used so that the halogen compound which is added through such an anode, comes into contact with fluoride not only at the end in direct contact with the electrolyte, but also along the entire outer surface of the anode immersed in the electrolyte since the added halogen thereby can pass through the pores or perforations of the anode. When any one of these types of hollow anodes is employed, it is recommended that the rate of flow of added organic reactant be high enough to prevent the flow of molten electrolyte up into the anode.

The added halogen-containing reactant may be charged to the electrolysis cell in pure concentrated form or, as indicated above, in admixture with molecular halogen such as chlorine, bromine, and iodine. In order to obtain the halogen-containing organic reactant in a more reactive form such as free radicals or ions, this reactant is vaporized or heated in a separate heating chamber prior to its introduction into the reaction zone. Alternately, it may be heated as it is added through the hollow anode which may be accomplished by providing the upper portion of the anode with a heating jacket which is heated to a high enough temperature to cause vaporization of this reactant. The organic reactant may also be vaporized as it is introduced into the hot reaction zone.

In carrying out the process of this invention, the halogen-containing reactant is contacted with an excess and actually infinite source of metallic fluoride. The desired concentration or rate of flow of added reactant is most conveniently and accurately determined by operating the cell for a period of time until a substantial amount of product produced at the anode is collected. The product is then analyzed by mass spectrometer analysis to determine which compounds are present and to what extent they are present. The rate of flow and concentration of added organic compound is then adjusted accordingly depending upon the extent to which the products obtained are fluorinated and the degree of fluorination of the desired products. The concentration of organic reactant which is introduced into the cell may vary over relatively wide limits without departing from the scope of this invention. For example, the halogen compound may be charged to the electrolysis cell at a rate so that between about 0.005 and about 2.0 moles per hour are brought into contact with the anode and metallic fluoride when using a 5 ampere cell.

The halogen compound is usually carried into the cell in a stream of inert diluent gas such as helium flowing at a rate from about 50 to about 500 ml. per minute, although higher and lower rates also may be employed without departing from the scope of the present invention.

The electrolyte, anode, and added halogen compounds are preferably substantially anhydrous, although the process can tolerate the presence of some water. The atmosphere which comes into contact with the reactants also should be substantially free of moisture and oxygen and preferably constitutes an inert gas such as nitrogen or helium. The absence of moisture is preferred in order to prevent the conversion of the metal fluoride to oxides, the presence of which results in the formation of the less desirable oxides of carbon which must of necessity be removed from the effluent gas when substantially pure fluorocarbons or fluorohalocarbons are desired as the product of the process of this invention. In addition, the electrolyte is substantially free of oxygen-containing compounds such as metal oxides and oxy-fluoro-metallates in order to prevent the formation of oxides of carbon instead of the desired fluorine-containing organic compound.

The negative electrode or cathode may be composed of any suitable electrically conductive material such as carbon, silicon, tellurium, or a metal such as iron, zinc, copper, lead, nickel, manganese, barium, tin, strontium, chromium, cobalt, and is preferably composed of a metal having a melting point above 1650° C. such as tungsten, titanium, tantalum, and molybdenum. The choice of material for the cathode is sometimes determined by consideration of the degree of purity desired in the metal product which is deposited at the cathode during the electrolysis. It has been found that when a carbon cathode is employed, metals deposited as a powder at the cathode are oftentimes contaminated with carbon. Thus, for example, when a pure metal is deposited as a second type product of the electrolysis, it is preferred whenever possible to employ a cathode material which is the same as the metal which will be deposited during the electrolysis reaction or which will not lead to contamination of the metal. The cathode may be molten (either floating or sub-merged) in the electrolyte or in the form of a solid rod or hollow pipe or plate which can be immersed in the electrolyte, or it may constitute any portion of all of the inner lining of the electrolytic cell. A solid cathode composed of a metal having a melting point above 1650° C. such as a metal of groups IV-B and V-B of the periodic system, is preferably employed since the use of such a cathode leads to essentially no contamination of the product produced at this electrode.

It is to be understood that multiple electrodes may be employed without departing from the scope of this invention. For example, more than one anode positioned in parallel or in some other manner may be used advantageously in order to obtain increased surface area for the site of reaction which occurs at the anode. The position of the anode with respect to the cathode may vary. For example, they may be positioned in the electrolyte so that they are parallel on the same or different levels, or they may be aligned in a coaxial or non-coaxial manner. However, in no case should they be close enough so that an electric arc is struck spontaneously between them during the electrolysis reaction inasmuch as it has been found that when such arcing occurs, the production of fluorohalocarbon ceases almost immediately. This is attributed to the fact that when the arc is struck between the electrodes, the electric current becomes localized in the path of the arc, with the result that substantially no current is carried by the molten electrolyte, and thus the hereindescribed anodic and cathodic reactions cease. Various methods may be employed to prevent such arcing once the electrolysis reaction of this invention has commenced. One method involves maintaining a sufficient distance between the anode and cathode during the electrolysis reaction. Another method which also is helpful in preventing spontaneous arcing between the anode and cathode involves the positioning of a shield made of a suitable electrical insulating material part way between the electrodes and in such a manner that any gas space within the cell between the cathode and anode above the surface of the electrolyte is separated. Such a suitable electrically non-conducting material is solidified electrolyte maintained in the solid state by means of localized cooling. Such cooling may be obtained by using metallic conductors of circulating coolant fluids or by using metal members with a radiating surface in the cooler space above the electrolyte level.

Both direct and alternating currents can be used in the process of this invention. When only an alternating current is employed, each electrode alternately functions as a cathode and as an anode, but the operating conditions permit the release of fluorocarbons. The use of direct currents is greatly preferred inasmuch as the process can thereby be more readily controlled to yield a desired result. In the case of normal direct current operation, each cathode and anode continuously function as such at a uniform voltage although the voltage can be varied during the run for optimal operation. One advantage for the use of direct current is that provision need be made only at the anode for the introduction of the added halogen compounds. Pulsating unidirectional current and superimposed alternating current on direct current also can be used and are to be regarded as types of direct current. When direct current is employed, it may sometimes be advantageous to switch the electrode terminals so that the electrodes are functioning alternately as anodes and cathodes.

The current densities which are employed in operating the process of this invention may vary over a relatively wide range without departing from the scope of this invention. Current densities of from about 0.01 to about 10 amperes per square centimeter of anode surface are usually employed in carrying out the process of this invention, although a current density of between about 0.5 and about 5 amperes per square centimeter of anode surface is preferred.

As previously mentioned, a substantially high cell potential is employed in the electrolysis process of this invention, i. e. a voltage of at least 30 volts. The process is generally conducted at a cell potential of between about 50 and about 120 volts although cell potentials as high as 250 volts or higher may be employed without departing from the scope of this invention. When cell potentials below 30 volts are employed, it has been observed that the process leads to at best only trace and usually zero percent yields of fluorocarbon and that no deposition of metal product is obtained. At a voltage of less than 15 volts essentially no detectable electrolysis of the metal fluoride takes place.

The temperature at which the reaction at the anode between the fluoride and added halogen compound takes place to form the fluorocarbon product may vary over a relatively wide range and it depends to a large extent upon the melting point of the electrolyte. As indicated above, the metal fluoride functions as the source of fluorine in the organic product produced at the anode, and it also functions as the electrolyte or carrier of current between the anode and cathode. Thus, sufficient heat must be applied to the reaction medium to melt at least that portion of the metal fluoride through which the current is to pass. The temperature at which the anodic reaction is actually taking place depends to a large extent, therefore, upon the melting point of the electrolyte, and is generally between about 100° C. and about 2,000° C. and is usually a temperature above 400° C. and below 1400° C. Generally the heat associated with the electrolysis is generated mostly at or near the surface of the anode. It is generally sufficient to maintain the electrolyte in the molten state, and application of heat by some other means during electrolysis is not required. However, external heat may be supplied, such as by a gas furnace, without departing from the scope of this invention.

The process of this invention may be carried out at pressures ranging from a few millimeters of mercury to about 10 atmospheres and is usually carried out at atmospheric pressure.

The source of heat initially required to melt the electrolyte may be an external source such as an open flame, an electrically or gas heated oven or furnace, etc., or an internal source of heat supplied by an induction or reverberatory furnace. It has been found that a convenient way of melting the electrolyte, and especially those having a melting point above about 700° C., is to contact the anode and cathode so that an electric arc is struck between them. The temperature generated by the arc, i. e. 3,000° C. to about 6,000° C., is high enough to melt the electrolytes employed herein. As stated hereinabove, there is no production of fluorocarbons at the anode while such an arc is in operation. It is only when conditions are such that the arcing between the electrodes ceases, that the electrolysis process of this invention and subsequent formation of fluorocarbon product commences. Thus the process of this invention is operable only when carried out under non-arcing conditions by which is meant under conditions such that there is no arc between the anode and cathode. The tiny arcs which are sometimes observed between the anode and molten electrolyte, on the other hand, do not interfere with the successful operation of the electrolysis reaction hereindescribed.

The accompanying figures are presented as a better understanding of the present invention.

Figure 1:
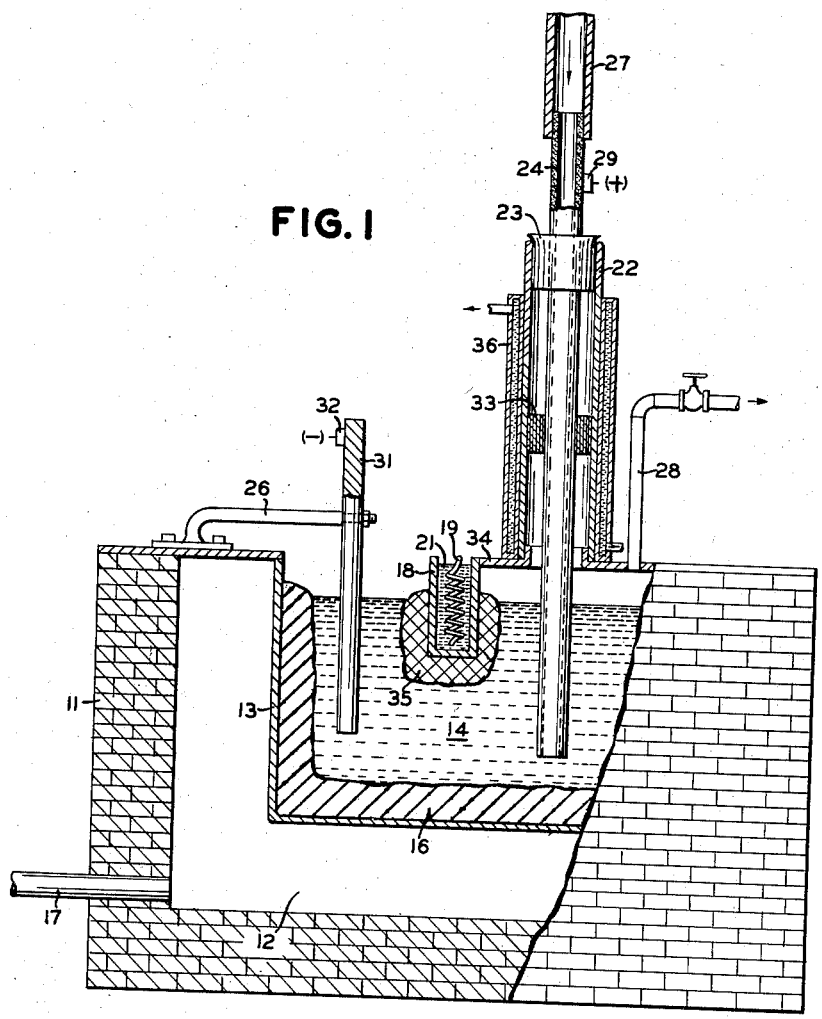
Figure 1 represents a diagrammatical elevational view, partly in cross section, of one embodiment of a suitable electrolysis cell for operating the process of this invention wherein the electrodes are arranged in a parallel configuration.

The essential parts of the apparatus of Figure 1 are the cell body 13 to which a partial cell cover 34 is fastened, the hollow anode 24 through which the added halogen compound is fed into the cell, the cathode 31 and conduit 28 by means of which the fluorocarbon product is passed from the cell into a receiver as it is formed.

The cell body 13 which serves as the receptacle for the electrolyte may be rectangular or circular in shape and is preferably fabricated from any material which is relatively resistant to corrosive action of any molten electrolyte with which it may come into contact during operation of the cell and which remains intact at the temperature at which the cell is operated. The cell body 13 is preferably made of stainless steel, copper, monel, nickel, or iron boiler plate. It is pointed out that in order to minimize heat loss from the cell as well as to minimize attack of the inner wall of the cell body by molten electrolyte, it is preferred that the interior of the cell body be in direct contact with solid electrolyte during operation of the cell. This is accomplished by positioning the cell body 13 in a furnace 11 which is preferably made of a refractory material such as brick. During actual operation of the cell the free space 12 between the cell body and the refractory material of the furnace is heated by any suitable means such as an air-gas torch 17 to a temperature which is below the melting point of the electrolyte. In this manner the portion of electrolyte 16 in contact with the cell body 13 is in its non-corrosive or solid state, and heat loss from the cell is minimized. The furnace also serves as a convenient means for supplying sufficient heat to the cell to melt the electrolyte at the start of the process.

The cell body 13 is provided with pipe 22 having the heating jacket 36 thereon which pipe may be an integral part of the cell cover 34 or it may be fastened to the cell cover by any suitable means such as bolts. The hollow anode 24 is fed into the cell through pipe 22 and is conveniently held in position by a bored rubber stopper 23 which also serves as a gas-tight seal to prevent loss of gaseous fluorocarbon from the cell. The anode 24 is connected to the source of current at 29 and is held centered in pipe 22 by means of asbestos tape packing 33 in order to prevent contact between the anode and pipe 22 and thereby avoid short circuiting of the cell. The inert diluent gas, if used, and added halogen compound are introduced downwardly into the hollow anode 24 by means of conduit 27 which conduit is suitably made of monel and is connected to a source of halogen compound not shown. In accordance with the preferred embodiment of this invention, the halogen compound is charged to the hollow anode in the vapor phase. When using a reactant which is a liquid or solid at room temperature, it may be vaporized prior to its introduction into the anode from a separate heating chamber not shown, the rate of flow of halogen compound being regulated by a valve positioned between the conduit 27 and the separate heating chamber. In some instances the added halogen compound, for example, carbon tetrachloride, is sufficiently volatile so that it does not condense during passage through the anode, the heat evolved from the cell being sufficient to maintain such reactants in the vapor phase. When using a less volatile material such as hexachlorobenzene, the use of the heating jacket 36 fitted to pipe 22 is recommended and is often necessary to prevent condensation of the vapors of added halogen compound within the anode, the heating jacket 36 being maintained at a sufficiently high temperature to maintain the compound in the vapor phase. The jacket may be heated by hot water, or other liquid of high boiling point, superheated steam or by electric coils or any other such conventional means. When halogen other than fluorine such as chlorine and bromine is used as an additional reactant, it also is introduced through the hollow carbon anode in admixture with the halogen compound.

The cell also is provided with the solid cathode 31 which is connected to the source of electric current at 32 and is composed of an electrically conductive material such as carbon or a metal. The cathode 31 is connected to the body of the apparatus by means of the connecting rod 26 which is electrically insulated therefrom.

The cell as illustrated in Figure 1 is particularly suited to operation when the elemental product which is formed at the cathode has a lower density than that of the molten electrolyte 14 and which does not ignite when in contact with air. Such a material, if either in the solid or liquid state, is prevented from floating over to the area of the anode by means of a barrier which separates the area near, at and above the surface of the molten electrolyte into separate compartments which are conveniently referred to as the upper cathode and anode compartments. Such a barrier is preferably an electrically non-conducting barrier and as shown in the accompanying Figure 1 comprises the metal pocket 18 which is suitably made of steel and may be an integral part of the cell cover 34. The metal pocket contains a suitable heat transfer medium 21 such as solid or molten metal which does not oxidize readily. A steel coil 19 through which a coolant such as air is circulated, is positioned in the heat transfer medium contained in the metal pocket 18. By use of a heat transfer medium having a temperature below that of the melting point of the electrolyte, the portion of electrolyte 35 which surrounds 18 is thereby solidified and acts as a means for preventing the passage of a metal deposit which is lighter than the electrolyte from the cathode to the anode compartment. Such a barrier is preferably composed of an electrically non-conducting material such as solid electrolyte since a barrier made of a conducting material would be polarized so that a positive charge would be obtained on the side facing the cathode, and a negative charge would be obtained on the side facing the anode resulting in two cells in series and defeating the purpose of such a barrier since the anode and cathode products would mix. The use of an electrically non-conducting material as a partial barrier between the anode and cathode also serves as an aid in preventing spontaneous arcing between the electrodes.

During operation of the cell the product evolved at the anode is removed from the cell by means of conduit 28 whereupon it is passed into suitable scrubbing baths to remove unreacted halogen such as chlorine, if used as a reactant, and is fractionated in conventional distillation apparatus into its individual components. When it is desired to have a higher percent of fluorine in any one or each of the products, the individual product or product mixture may be recycled to the reaction zone and employed as a reactant without departing from the scope of this invention.

The actual operation of an electrolysis cell of the type illustrated by the accompanying Figure 1 is described in the following Example 1 which example is not to be construed as unnecessarily limiting to the present invention.

*Example 1*

This example illustrates the production of fluorochlorocarbons by the electrolysis of potassium fluotantalate in the presence of perchloropropene.

The type of cell illustrated in Figure 1 and above-discussed is fitted with a tungsten cathode and a hollow carbon anode and is heated externally by means of an air-gas torch positioned in the brick-pile furnace. The cell is then charged with potassium fluotantalate, the temperature of the furnace being maintained high enough to melt the salt as it is added to the cell. The potassium fluotantalate is added until the level of molten electrolyte in the cell is above the bottom of the steel pocket 18 of Figure 1. The furnace is then cooled to a temperature of about 400° C. whereupon the electrolyte next to the wall of the cell body solidifies. During this operation air is circulated through coil 19 which is immersed in silver solder 21 contained in the steel pocket 18 at a rate sufficient to solidify the electrolyte 35 which surrounds the steel pocket. There is no evolution of fluorine-containing organic compounds as the electrolyte is melted.

Perchloropropene vapor in admixture with helium is then charged to the electrolysis cell through the carbon anode at a rate of about 1 mol per hour, a source of direct current is applied to the cell and the reaction is carried out at atmospheric pressure and at a current density of about 2 amperes per square centimeter of anode surface and at a cell potential of about 90 volts. A mixture of fluorine-containing organic compounds is produced at the anode, the predominating compounds being dichlorodifluoromethane, trifluorochloromethane, and perfluorochloropropane having a fluorine:chlorine ratio of at least 1:1. Tantalum metal in substantially pure form is produced at the tungsten cathode and is recovered as a product of the process.

Figure 2:
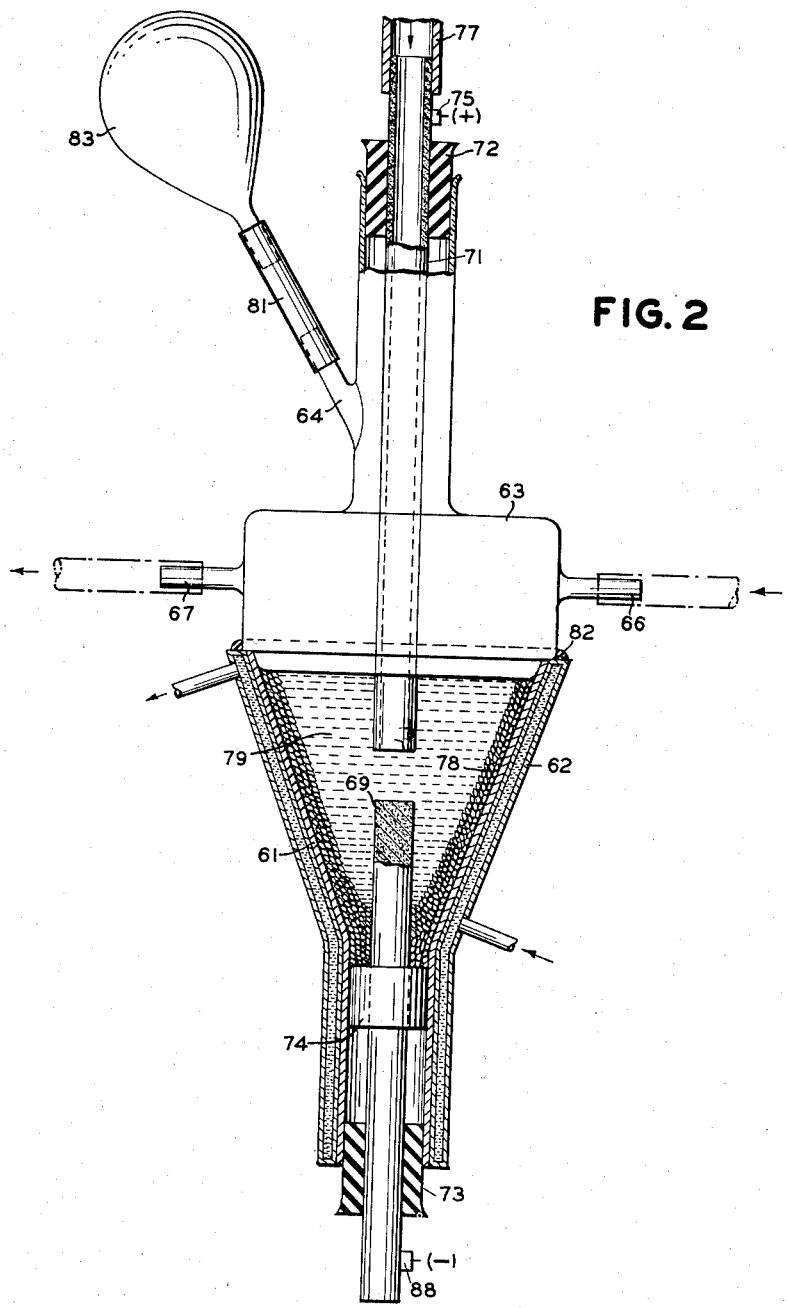
Figure 2 represents a diagrammatical elevational view, partly in cross section, of one embodiment of a suitable electrolysis cell for operating the process of this invention wherein the electrodes are arranged in a coaxial manner.

The essential parts of the apparatus illustrated in the accompanying Figure 2 are the funnel shaped copper cell body 61 having the water-cooled jacket 62, a glass cell cover 63, a hollow carbon rod 71 having a ¾" outer diameter and a ½" inner diameter as the anode, a solid carbon rod 69 having a ½" diameter as the cathode, conduit 77 for introducing the halogen compound downward through the hollow anode, an outlet 67 by means of which the fluorine-containing organic product is removed from the cell as it is produced and an inlet 66 through which an inert gas such as helium may be introduced into the cell to obtain an inert atmosphere within the cell. It is to be understood that when it is desired to conduct the process of this invention in the presence of added chlorine, for example, in addition to the added halogen compounds such a reactant also may be introduced into the cell through the hollow carbon anode in admixture with the halogen compound.

In setting up the cell for carrying out the process of this invention, the cathode 69 is inserted upwardly through the stem of the copper funnel and is held in place by means of the bored rubber stopper 73. Asbestos tape 74 is packed around the lower portion of the cathode in the stem of the funnel and serves to keep the cathode centered in the apparatus so that short circuits between the cathode and the cell are avoided. The Pyrex glass cover 63 having an open upper end is then placed on the upper flange of the cell body and is tightly held to it by a Gooch rubber connection 82. The solid metal fluoride electrolyte is then charged to the cell from container 83 by means of conduit 64 which is connected to the electrolyte container 82 by means of thin wall rubber tubing 81. The electrolyte container 83 may be lowered or raised at will depending upon whether or not it is desired to add additional electrolyte at any stage of the process. The electrolyte is packed around the cathode maintaining the electrolyte level below the top surface of the cathode. The hollow anode 71 is then inserted downwardly into the neck of the glass cover and is held in place by means of the bored rubber stopper 72. The anode is then lowered until it makes contact with the cathode and a direct source of current is then applied to the cell by means of battery clips at 75 and 88. An electric arc is then struck between the ends of the electrodes by breaking contact between them. When a brilliant arc is obtained, additional solid electrolyte is added to the cell through conduit 64 by raising the container 83. The electrolyte becomes molten in the vicinity of the arc and additional electrolyte is added to the cell until there is enough liquid electrolyte 79 to completely immerse the ends of the carbon anode 71 and the carbon cathode 69. This latter operation causes the arcing to stop.

The cathode and anode are then moved apart gradually as more electrolyte is added and melted. The ends of the electrodes are moved apart so as to have at least a ½" gap between them to prevent spontaneous arcing once the electrolysis reaction has commenced. During operation of the cell, cold water is continuously passed through the jacket 62 in order to keep electrolyte 78 next to the copper reactor in the solid state so as to prevent the attack of the copper by molten electrolyte or the melting of the reactor which might result from its reaching the temperature of the molten electrolyte. At any stage of the process an inert gas such as helium may be charged to the electrolysis cell by means of conduit 66 having a stopcock thereon which stopcock is not shown. Thus the cell may be swept with helium to obtain an inert atmosphere within the cell prior to introduction of the electrolyte.

As indicated above, the low voltage (i. e. below 30 volts) which is apparent when the arc is in operation increases markedly when the operation of the cell changes from an arcing process to an electrolytic process, there being essentially no formation of metal or fluorine-containing organic compounds while the arc is in operation. As soon as the arc between the electrodes is removed, the voltage of the cell increases to a value above 30 volts and a mixture of halocarbons is evolved and is allowed to pass from the cell by means of conduit 67 whereupon the mixture is collected in suitable apparatus and distilled into its various components.

The following examples are offered as a further and better understanding of the present invention and are not to be construed as unnecessarily limiting thereto. The percent yields given in the following examples are based on the number of coulombs and were calculated using the following formula:

Percent yield =

$$100 \times \left[ \frac{\frac{\text{moles of product} \times \text{No. of F atoms in product}}{\text{amperes} \times \text{time (seconds)}}}{96{,}500} \right]$$

*Example 2*

The electrolysis cell illustrated in the accompanying Figure 2 was fitted with the above-described carbon anode and carbon cathode and was charged with sodium fluoaluminate, a current of 10.5 amperes at 20 volts was applied to the electrodes, and the sodium fluoaluminate was melted as described above by striking an arc between the ends of the electrodes. During this operation helium was continuously swept through the cell and a gap of not more than 3/8" was maintained between the ends of the cathode and anode in order to maintain the presence of the arc through the molten electrolyte across the ends of the electrodes. The gas evolved from the cell under these conditions was collected and upon mass spectrometer analysis, the gas evolved from the cell was found to contain only helium and not even the slightest trace of a fluorine-containing organic compound. No metal was deposited at the cathode during this operation.

*Example 3*

The electrolysis reaction of this example was carried out in the above-described cell illustrated by Figure 2 using the indicated solid carbon anode and carbon cathode. The cell was charged with sodium fluoaluminate which was melted as described in Example 2 above using an electric arc as the source of heat required to melt this electrolyte. When sufficient molten electrolyte was obtained to immerse the ends of the electrodes, the arc stopped and the electrodes were moved apart gradually so that at least ½" existed between the ends of the electrodes. As soon as the arc ceased, the current changed to about 4.5 amperes and the cell potential rose to about 80 volts. Helium gas was then passed through a sintered glass dispersion tube at a rate of about 263 ml. per minute, into carbon tetrachloride at 25° C. and at atmospheric pressure, to obtain helium saturated with carbon tetrachloride vapor, and this admixture was then allowed to pass downwardly through the hollow carbon anode. As this admixture was added through the anode, the product evolved at the anode was allowed to pass from the cell into a glass receiver. After 0.4 hour, the gaseous product from the cell was analyzed by mass spectrometer analysis and was found to contain 1.6% dichlorotetrafluoroethane; 1.2% trichlorotrifluoroethane; 4.9% hexafluoroethane; 41.8% dichlorodifluoromethane; 4.9% trichlorofluoromethane and 36.9% chlorotrifluoromethane and 1.6% dichlorodifluoroethylene which represented a total yield of 93% of fluorocarbons. Essentially no tetrafluoromethane was produced. An 81% yield of aluminum was deposited at the cathode during this electrolysis reaction and was recovered as a product of the process. Fluorochlorocarbons are similarly produced by employing melts containing magnesium fluoride, calcium fluoride, potassium fluotitanate and the other metal fluorides as electrolytes instead of sodium fluoaluminate.

The procedure of this example was repeated except that the helium was bubbled through the carbon tetrachloride at a rate of about 235 cc. per minute instead of 263 cc. per minute. The reaction was carried out under non-arcing conditions at a current of about 4.2 amperes and at a cell potential of about 91 volts. After 23 minutes the gas evolved from the cell was analyzed by mass spectrometer analysis and was found to contain yields of 2.8% hexafluoroethane; 66% dichlorodifluoromethane; 2.8% trichlorofluoromethane and 51% chlorotrifluoromethane. Essentially no tetrafluoromethane was produced as a product of this reaction. A 72% yield of aluminum deposited at the cathode during this electrolysis reaction and was recovered as a product of the process.

The above Example 3 led to the production of fluorochlorocarbons in improved yield and selectivity as compared to the yields of products obtained when the electrolysis is carried out in the presence of molecular chlorine as the sole source of this halogen. For example, when sodium fluoaluminate was electrolyzed under non-arcing conditions using a direct current of about 4.5 amperes and a cell potential of about 72 volts, the reaction mixture was found to contain a high yield of tetrafluoromethane (34%), a 23% yield of trifluoromethyl chloride, 10% of dichlorodifluoromethane and a substantially higher yield of hexafluoroethane (6%).

*Example 4*

The electrolysis reaction of this example was carried out in the above described cell illustrated by Figure 2 using the indicated solid carbon anode and carbon cathode. The cell was charged with sodium fluoaluminate which was melted as described in Example 2 above using an electric arc as the source of heat required to melt this electrolyte. When sufficient molten electrolyte was obtained to immerse the ends of the electrodes, the arc stopped and the electrodes were moved apart gradually so that at least a ½" gap existed between the ends of the electrodes. As soon as the arc ceased, the current changed to about 5.5 amperes and the cell potential rose to about 72 volts. Helium gas was then passed through a sintered glass dispersion tube at a rate of about 258 ml. per minute, into trichloroethylene at 25° C. and at atmospheric pressure, to obtain helium saturated with trichloroethylene vapor, and this mixture was then allowed to pass downwardly through the hollow carbon anode. As this admixture was added through the anode, the product evolved at the anode was allowed to pass from the cell into a glass receiver. After 53 minutes, the gas stream from the cell was analyzed by mass spectrometer analysis and was found to contain yields of 60% of trifluorochloromethane and 6.4% of dichlorodifluoromethane and 0.7% of dichlorodifluoroethylene, and 2.2% of hexafluoroethane. Essentially no tetrafluoromethane was produced as a product of this reaction. A 72% yield of aluminum was deposited at the cathode and was recovered as a product of the process. Fluorochlorocarbons are similarly produced by carrying out the electrolysis of sodium fluoaluminate in the presence of added trichloromethane instead of trichloroethylene.

*Example 5*

The electrolysis reaction of this example was carried out in the above-described cell illustrated by Figure 2 using the indicated solid carbon anode and carbon cathode. The cell was charged with sodium fluoaluminate which was melted as described in Example 2 above using an electric arc as the source of heat required to melt this electrolyte. When sufficient molten electrolyte was obtained to immerse the ends of the electrodes, the arc stopped and the electrodes were moved apart gradually so that at least ½" existed between the ends of the electrodes. As soon as the arc ceased, the current changed to about 7.2 amperes and the cell potential rose to about 87 volts. Helium gas was then passed through a sintered glass dispersion tube at a rate of about 370 ml. per minute, into tetrachloroethylene at 25° C., to obtain helium saturated with tetrachloroethylene vapor, and this admixture was then allowed to pass downwardly through the hollow carbon anode. As this admixture was added through the anode, the product evolved at the anode was allowed to pass from the cell into a glass receiver. After 25 minutes, the gaseous product evolved from the cell was analyzed by mass spectrometer analysis and was found to contain a yield of 59% of trifluorochloromethane. Essentially no tetrafluoromethane was produced as a product of this reaction. An 88% yield of aluminum was deposited at the cathode and was recovered as a product of the process.

*Example 6*

The electrolysis reaction of this example was carried out in the above-described cell illustrated by Figure 2 using the indicated solid carbon anode and carbon cathode. The cell was charged with sodium fluoaluminate which was melted as described in Example 2 above using an electric arc as the source of heat required to melt this electrolyte. When sufficient molten electrolyte was obtained to immerse the ends of the electrodes, the arc stopped and the electrodes were moved apart gradually so that at least a ½" gap existed between the ends of the electrodes. Helium gas flowing at a rate of about 182 ml. per minute was then admixed with acetylene flowing at a rate of about 22 ml. per minute at 25° C. and atmospheric pressure. This admixture was then continuously passed downwardly through the hollow carbon anode and the electrolysis reaction was carried out at a current of 5.1 amperes and at a cell potential of about 100 volts. After one hour a sample of the gaseous product evolved at the anode was analyzed by mass spectrometer analysis and was found to contain a yield of 30% of tetrafluoromethane and 12% of hexafluoroethane. A 65% yield of aluminum was deposited at the cathode and represented the total yield of aluminum produced during one hour of operation of the cell under the above conditions.

*Example 7*

The electrolysis reaction of this example was carried out in the above-described cell illustrated by Figure 2 using the indicated solid carbon anode and carbon cathode. The cell was charged with sodium fluoaluminate which was melted as described in Example 2 above using an electric arc as the source of heat required to melt this electrolyte. When sufficient molten electrolyte was obtained to immerse the ends of the electrodes, the arc stopped and the electrodes were moved apart gradually so that at least a ½" gap existed between the ends of the electrodes. Helium gas flowing at a rate of about 240 ml. per minute was then admixed with acetylene flowing at a rate of about 22 ml. per minute at 25° C. and atmospheric pressure. This admixture was then continuously passed downwardly through the hollow carbon anode and the electrolysis reaction was carried out at a current of 6.2 amperes and at a cell potential of 93 volts. After 7 minutes, a sample of the gaseous product evolved at the anode was analyzed by mass spectrometer analysis and was found to contain a yield of 21% of tetrafluoromethane and 13.7% of hexafluoroethane. A 44% yield of aluminum was produced at the cathode after operation of the cell under the above conditions for a period of about 69 minutes.

The process of the present invention may be carried out in a batchwise or continuous manner as desired. The preferred method of operation involves continuously charging the added halogen compound to the electrolysis cell as described hereinabove accompanied by the continuous removal and collection of fluorine-containing product as it is formed at the anode.

As is apparent, the process of this invention is an electrolysis process involving the passage of current through a melt containing a metal fluoride between a cathode and an anode, said anode being in contact with an added halogen compound which is preferably one having chlorine and/or bromine as the only halogen substitution at a cell potential above 30 volts. The molten metal fluoride is substantially anhydrous and free of oxygen-containing compounds such as metal oxides. Once the electrolyte has been liquified by any suitable means, the molten electrolyte carries the applied current between the electrodes, the electrolyte remains molten and the reaction proceeds as described herein without the necessity of external or internal heating. Various alterations and modifications of the conditions, apparatus, and reactants employed may become apparent to those skilled in the art without departing from the scope of this invention.

I claim:

1. A novel process for the electrolytic production of a fluorine-containing organic compound which comprises passing an electric current through a melt of an inorganic compound of fluorine containing at least one metal constituent in contact with a cathode and an anode, said anode being in contact with an added organic compound at a voltage sufficiently high to electrolyze said melt, to produce a fluorine-containing organic compound and recovering said fluorine-containing organic compound as a product of the process.

2. A novel process for the electrolytic production of a fluorine-containing organic compound which comprises passing an electric current through a melt of an inorganic compound of fluorine containing at least one metal constituent in contact with a cathode and an anode, said anode being in contact with a hydrocarbon at a voltage sufficiently high to electrolyze said melt, to produce a fluorine-containing organic compound and recovering said fluorine-containing organic compound as a product of the process.

3. The novel process of claim 2 in which said hydrocarbon is acetylene.

4. A novel process for the electrolytic production of a fluorine-containing organic compound which comprises passing an electric current through a melt of an inorganic compound of fluorine containing at least one metal constituent in contact with a cathode and an anode, said anode being in contact with an added halogen-containing organic compound at a voltage sufficiently high to electrolyze said melt, to produce a fluorine-containing organic compound and recovering said fluorine-containing organic compound as a product of the process.

5. A novel process for the electrolytic production of a fluorine-containing organic compound which comprises passing an electric current through a melt of an inorganic compound of fluorine containing at least one metal constituent in contact with a cathode and an anode, said anode being in contact with an added halogen-containing aliphatic compound having from 1 to about 10 carbon atoms per molecule at a voltage sufficiently high to electrolyze said melt, to produce a fluorine-containing organic compound and recovering said fluorine-containing organic compound as a product of the process.

6. A novel process for the electrolytic production of a fluorine-containing organic compound which comprises electrolyzing a melt of an inorganic compound of fluorine containing at least one metal constituent in contact with a cathode and an anode, said anode being in contact with an added perchloroalkane at a cell potential of at least 30 volts, to produce a fluorine-containing organic compound and recovering said fluorine-containing organic compound as a product of the process.

7. The novel process of claim 6 in which said perchloroalkane is carbon tetrachloride.

8. A novel process for the electrolytic production of a fluorine-containing organic compound which comprises electrolyzing a melt of an inorganic compound of fluorine containing at least one metal constituent in contact with a cathode and an anode, said anode being in contact with an added perchloroalkene at a cell potential of at least 30 volts, to produce a fluorine-containing organic compound and recovering said fluorine-containing organic compound as a product of the process.

9. The novel process of claim 8 in which said perchloroalkene is tetrachloroethylene.

10. A novel process for the electrolytic production of a fluorine-containing organic compound which comprises electrolyzing a melt of an inorganic compound of fluorine containing at least one metal constituent in contact with a cathode and an anode, said anode being in contact with an added partially chlorinated alkane at a cell potential of at least 30 volts, to produce a fluorine-containing organic compound and recovering said fluorine-containing organic compound as a product of the process.

11. The novel process of claim 10 in which said partially chlorinated alkane is trichloromethane.

12. A novel process for the electrolytic production of a fluorine-containing organic compound which comprises electrolyzing a melt of an inorganic compound of fluorine containing at least one metal constituent in contact with a cathode and an anode, said anode being in contact with an added partially chlorinated alkene at a cell potential of at least 30 volts, to produce a fluorine-containing organic compound and recovering said fluorine-containing organic compound as a product of the process.

13. The novel process of claim 12 in which said partially chlorinated alkene is trichloroethylene.

14. A novel process which comprises electrolyzing a melt of a metal fluoride in contact with a cathode and a carbon anode at a cell potential of at least 30 volts while continuously introducing vapors of an organic compound into said melt in such a manner that they are contacted with the carbon anode, to produce a fluorine-containing organic compound and recovering said fluorine-containing organic compound as it is formed.

15. The novel process of claim 14 in which said metal fluoride contains a metal of group I of the periodic system.

16. The novel process of claim 14 in which said metal fluoride contains a metal of group II of the periodic system.

17. The novel process of claim 14 in which said metal fluoride contains a metal of group III of the periodic system.

18. The novel process of claim 14 in which said metal fluoride contains a metal of group IV of the periodic system.

19. The novel process of claim 14 in which said metal fluoride contains a metal of group V of the periodic system.

20. A novel process which comprises electrolyzing a melt containing potassium fluoride in contact with a hollow carbon anode at a cell potential of at least 30 volts while continuously passing vapors of carbon tetrachloride through the hollow carbon anode to produce a fluorochlorocarbon and recovering said fluorochlorocarbon as a product of the process.

21. A novel process which comprises electrolyzing a melt containing magnesium fluoride in contact with a hollow carbon anode at a cell potential of at least 30 volts while continuously passing vapors of carbon tetrachloride through the hollow carbon anode to produce a fluorochlorocarbon and recovering said fluorochlorocarbon as a product of the process.

22. A novel process which comprises electrolyzing a melt containing sodium fluoaluminate in contact with a hollow carbon anode at a cell potential of at least 30 volts while continuously passing vapors of carbon tetrachloride through the hollow carbon anode to produce a fluorochlorocarbon and recovering said fluorochlorocarbon as a product of the process.

23. A novel process which comprises electrolyzing a melt containing sodium fluoaluminate in contact with a hollow carbon anode at a cell potential of at least 30 volts while continuously passing vapors of trichloroethylene through the hollow carbon anode to produce a fluorochlorocarbon and recovering said fluorochlorocarbon as a product of the process.

24. A novel process which comprises electrolyzing a melt containing sodium fluoaluminate in contact with a hollow carbon anode at a cell potential of at least 30 volts while continuously passing vapors of tetrachloroethylene through the hollow carbon anode to produce a fluorochlorocarbon and recovering said fluorochlorocarbon as a product of the process.

25. A novel process which comprises electrolyzing a melt containing an alkali metal fluotitanate in contact with a hollow carbon anode at a cell potential of at least 30 volts while continuously passing vapors of trichloromethane through the hollow carbon anode to produce a fluorochlorocarbon and recovering said fluorochlorocarbon as a product of the process.

26. A novel process which comprises electrolyzing a melt containing potassium fluotantalate in contact with a hollow carbon anode at a cell potential of at least 30 volts while continuously passing vapors of carbon tetrachloride through the hollow carbon anode to produce a fluorochlorocarbon and recovering said fluorochlorocarbon as a product of the process.

27. A novel process which comprises electrolyzing a melt containing sodium fluoaluminate in contact with a hollow carbon anode at a cell potential of at least 30 volts while continuously passing vapors of acetylene through the hollow carbon anode to produce a fluorine-containing organic compound and recovering said fluorine-containing organic compound as a product of the process.

References Cited in the file of this patent

UNITED STATES PATENTS 2,519,983     Simons  ---------------- Nov. 29, 1948